(12) United States Patent
Maack

(10) Patent No.: US 7,831,109 B2
(45) Date of Patent: Nov. 9, 2010

(54) METHOD AND DEVICE FOR GENERATING SUB-IMAGES

(75) Inventor: Hanns-Ingo Maack, Norderstedt (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 960 days.

(21) Appl. No.: 10/529,682

(22) PCT Filed: Sep. 22, 2003

(86) PCT No.: PCT/IB03/04185

§ 371 (c)(1),
(2), (4) Date: Mar. 29, 2005

(87) PCT Pub. No.: WO2004/003284

PCT Pub. Date: Apr. 15, 2004

(65) Prior Publication Data

US 2007/0098236 A1    May 3, 2007

(30) Foreign Application Priority Data

Oct. 1, 2002    (DE) ................................ 102 45 715

(51) Int. Cl.
*G06K 9/32* (2006.01)
(52) U.S. Cl. .................. 382/299; 382/100; 382/128
(58) Field of Classification Search ............... None
See application file for complete search history.

(56) References Cited

U.S. PATENT DOCUMENTS

| | | | |
|---|---|---|---|
| 5,262,871 A | | 11/1993 | Wilder et al. |
| 5,394,187 A | * | 2/1995 | Shipp ................... 348/269 |
| 5,684,850 A | | 11/1997 | Warburton et al. |
| 5,844,242 A | * | 12/1998 | Jalink et al. ........... 250/370.09 |
| 5,949,483 A | * | 9/1999 | Fossum et al. ............ 348/303 |
| 6,072,570 A | * | 6/2000 | Chipman et al. .......... 356/124 |
| 6,215,848 B1 | | 4/2001 | Linders et al. |

(Continued)

FOREIGN PATENT DOCUMENTS

EP    1089555 A1 *    4/2001

(Continued)

OTHER PUBLICATIONS

High Resolution and High Sensitivity CMOS—for X ray, Harumichi et al, 2002, IEEE, 07803-7324-3,29-32.*

(Continued)

*Primary Examiner*—Samir A. Ahmed
*Assistant Examiner*—Jayesh Patel

(57) ABSTRACT

In the generating of images by means of a two-dimensional field of image sensors, notably by means of a flat dynamic X-ray detector FDXD, adherence to the maximum data rate $G_{max}$ of an evaluation unit (1) requires satisfying the relation $\Delta x \cdot \Delta y \cdot f/b \leq G_{max}$ between the width $\Delta x$ and the height $\Delta y$ of a sub-region of the image sensor read out, the imaging rate f and the binning factor b. In conformity with the method, parameters defining the size, position and/or shape of the sub-region can be preset at will, the other variables of the inequality being adapted, if necessary, in such a manner that the inequality remains satisfied. In the context of the method there is also performed a mosaic calibration during which calibration images of the complete image sensor are composed from calibration images of sub-regions.

19 Claims, 2 Drawing Sheets

U.S. PATENT DOCUMENTS

Figure 1:
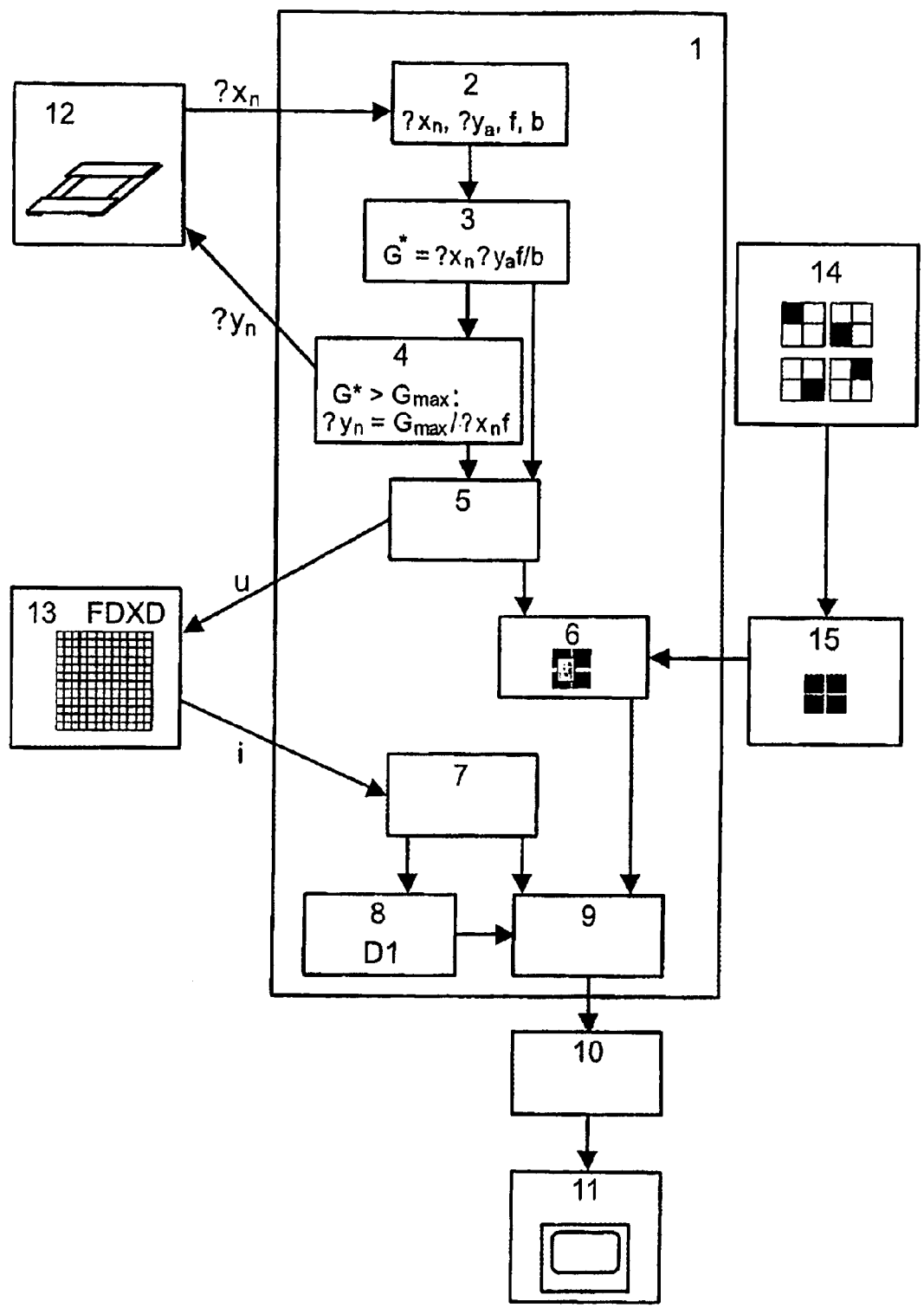

| | | | |
|---|---|---|---|
| 6,355,420 B1* | 3/2002 | Chan | 435/6 |
| 6,854,885 B2* | 2/2005 | Wischmann et al. | 378/207 |
| 6,921,200 B1* | 7/2005 | Booysen et al. | 378/205 |
| 7,091,466 B2* | 8/2006 | Bock | 250/208.1 |
| 7,489,799 B2* | 2/2009 | Nilsen et al. | 382/100 |
| 2002/0017608 A1 | 2/2002 | Pyyhtia et al. | |
| 2003/0016301 A1* | 1/2003 | Aizaki et al. | 348/345 |
| 2003/0095629 A1* | 5/2003 | Nascetti et al. | 378/98.8 |
| 2003/0151683 A1* | 8/2003 | Karunen et al. | 348/246 |

FOREIGN PATENT DOCUMENTS

| | | |
|---|---|---|
| EP | 1207683 A2 | 5/2002 |
| WO | WO9740621 A1 | 10/1997 |

OTHER PUBLICATIONS

Ion Imaging System software Whip, Imaging manual whip Basic steps, pp. 1-4.*

Adjusting the Horizontal—Cameras, T10155, date Sep. 29, 1998, p. 1.*

Harumichi et al. High resolution and high sensitivity CMOS—X-ray,2002,IEEE, 0-7803-7324-3, pp. 29-33.*

Adjusting the Horizontal offset—Cameras, Hamamatsu,T10155, Sep. 29, 1998, p. 1.*

Ion Imaging—WHIP, Larry R Nittler, Stardust Imaging manual,1992, pp. 1-3.*

ISR of International Publication No. PCT/IB/2003/04185 Contained in International Publication No. WO2004032484, 2003.

* cited by examiner

METHOD AND DEVICE FOR GENERATING SUB-IMAGES

The invention relates to a method of operating an imaging device with a two-dimensional field of image sensors as well as an evaluation unit which is capable of reading out and processing the pixel signals, representing output signals of image sensors combined by a binning operation, at a maximum rate of no more than $G_{max}$. The invention also relates to an imaging device of such a kind which is suitable for carrying out the method.

Imaging devices comprising a two-dimensional field of individual image sensors are known from digital photo cameras, video cameras or X-ray apparatus. Flat dynamic X-ray detectors (FDXDs) will be considered hereinafter by way of example, however, without the invention being restricted thereto in any way.

Flat dynamic X-ray detectors of known construction comprise a very large number of individual image sensors which is typically of the order of magnitude of 2000×2000. Furthermore, images can be read out from the field of the image sensors with comparatively high image or imaging rates of typically-30 Hz or more. The transfer of the pixel signals to the electronic evaluation circuitry and their processing therein nowadays is still limited by a maximum rate $G_{max}$ to such an extent that it is not possible to read out the entire field of image sensors at the maximum imaging rate. In order to comply with these hardware-imposed restrictions, in known X-ray detectors three different methods are used either individually or in combined form:

1. The images are read out at an imaging rate which is smaller than the largest possible imaging rate.
2. A so-called binning operation is performed in which the signals from small groups of neighboring image sensors (typically 2×2, 3×3, etc.) are combined so as to form a pixel signal of reduced spatial resolution. The binning factor b then describes the number of combined image sensors.
3. The edges of the field or not read out, so that only a sub-region which is situated at the center of the field and usually has a square shape is read out.

In practice, however, often only inadequate results can be achieved by means of these methods. For example, the image formats available for clinical use are often less than optimum, so that body regions of interest are not completely imaged.

Considering the foregoing it is an object of the present invention to provide an imaging device and a method of operating such a device which enable improved adaptation of imaging parameters in conformity with practical requirements.

This object is achieved by means of a method as disclosed in the characterizing part of claim 1 and by means of an imaging device as disclosed in the characterizing part of claim 9. Advantageous embodiments are disclosed in the dependent claims.

The method in accordance with the invention serves for the operation of an imaging device which comprises a two-dimensional field of image sensors as well as an evaluation unit which is capable of reading out and processing the pixel signals at a maximum rate of no more than $G_{max}$ (number of pixel signals read per unit of time). The image sensors generate a respective (preferably electrical) output signal which corresponds to the amount of radiation detected by the relevant image sensor. These output signals are combined, by way of a binning operation, so as to form said pixel signals; formally speaking, in this respect binning with the binning factor b=1, for which the pixel signals are identical to the output signals of the image sensors, should also be included. The following steps are carried out in conformity with the method:

At least one parameter is preset in order to define a sub-region of the field. For example, the width and the position of a corner point (=three parameters) of a rectangular sub-region can be preset.

Any remaining parameters for defining the sub-region (its height in the present example) and the binning factor b (number of image sensors combined in a pixel signal) and the imaging rate f (number of completely read-out images per unit of time) are defined in such a manner that the maximum rate $G_{max}$ of the evaluation unit is not exceeded during the reading out of all pixel signals from the sub-region of the field. If n is the number of sub-sensors in the sub-region, the above condition can be expressed in the following formula:

$$nf/b \leq G_{max} \tag{1}$$

The described method enables flexible presetting of a sub-region of the field of image sensors in respect of its position, shape, size etc., the other imaging parameters subsequently being automatically adapted in such a manner that on the one hand the limit of the imaging device is complied with while on the other hand its capacity is optimally used.

Preferably, the image sensors are arranged in a periodic pattern, for example, a grid with rectangular or hexagonal cells in a rectangular field, and the shape of the sub-regions is chosen to be rectangular with its sides extending parallel to the edges of the field. Such a shape of the sub-regions is advantageous from a processing point of view, because the evaluation of corresponding image sensor fields usually takes place in a manner based on rows and columns. A sub-region, therefore, can be completely described by two corner points (that is, four parameters) and be read out in a very simple manner.

Furthermore, the image sensors preferably are X-ray sensors which generate (directly or indirectly) an electrical signal which is dependent on the absorbed amount of X-rays. When X-ray apparatus is used, for example, a flat dynamic X-ray detector (FDXD) for medical diagnosis and therapy, the flexible selectability of the sub-region to be imaged is particularly advantageous, because the imaging can thus be adjusted to the body region of interest without changing the position of the X-ray equipment. Moreover, for many interventions, for example, concerning veins or the oesophagus, elongate, rectangular image formats are optimum; such formats can be simply chosen in conformity with the method. The size of the imaged region, and hence the radiation load for the patient, can be limited to the inevitable minimum because of the flexibility in choosing the region.

In conformity with a special version of the method the sub-region is preset in a service mode, the service mode being distinct from the normal mode of operation of the imaging device in that it requires special authorization by the user. Customarily, the settings that are possible in the service mode can be realized only by specialist service personnel for the imaging device (for example, an X-ray apparatus). Such personnel can then individually preset the individual field of application of the imaging device as well as the sub-regions in conformity with the wishes of the user, so that a selection can be made from among the preset sub-regions during the subsequent normal mode.

According to a preferred version of the method there are imposed rules in conformity with which variables can be changed relative to their current values in order to ensure that the maximum rate $G_{max}$ is adhered to. For example, after preselection of the entire sub-region the user can primarily attempt to satisfy the inequality (1) by changing the imaging rate f, the current value of the binning factor b then being used for further adaptation only if the imaging rate f exceeds given limits.

In conformity with a further version of the method, the evaluation of the pixel signals in the evaluation unit is performed by means of calibration images related to the relevant sub-region. Moreover, the calibration images may also be related in a conventional manner to other imaging parameters such as, for example, the imaging rate. Particularly in the case of X-ray apparatus it is necessary to calibrate the image signals read out in order to achieve an optimum imaging quality. This necessitates the use of calibration images which reproduce the same (sub-) region subject to given secondary conditions. For example, the correction of an offset requires dark images as calibration images in the form of dark images which have been acquired with the same values of the imaging rate and binning factor in the absence of irradiation of the image sensors.

The previously mentioned calibration images usually are not available in finished form, because the position of the sub-region is arbitrary. The acquisition of calibration images, therefore, preferably takes place in the following steps:

1. The entire array of image sensors is decomposed into sub-regions. The sub-regions should together cover the entire surface of the array, but overlapping of the sub-regions is permissible.
2. For each of the sub-regions there are formed calibration images which relate to the relevant sub-region as well as possibly to further necessary imaging parameters (for example, binning or imaging rate). The sub-regions are to be chosen in the step 1 in such a manner that the generating of such calibration images is possible. Notably the size of the sub-regions in relation to the relevant binning and the imaging rate used should be chosen to be so small in the step 1 that the maximum rate $G_{max}$ of the evaluation unit is not exceeded during the generation of the calibration images.
3. From the acquired calibration images of the sub-regions there are formed overall calibration images which are related to the entire field of image sensors and any further imaging parameters involved. For example, an overall offset image of the field is formed by piece-wise composition from offset sub-images (allocation of priority to given offset sub-images or averaging being permissible in regions of overlap of the offset sub-images).
4. Finally, during the operation of the imaging device the calibration image related to an arbitrary new sub-region can be acquired in that it is selected simply as a corresponding part from the stored overall calibration images.

The described calibration method offers the advantage that a major part of the work required for forming calibration images has to be carried out only once in advance (steps 1 to 3), and that in the course of the operation (step 4) for any arbitrary sub-region the associated calibration image can be simply formed from the results obtained.

Notably dark images of a predetermined sub-region can be generated and used as calibration images. Dark images are characterized in that the image sensors were not exposed to any radiation during their formation, so that the dark images reflect the offset of the output signals generated by the image sensors. The offset is subtracted from a measured image during its calibration. The acquisition of dark images can also take place, if desired, during operation of the imaging device. In the case of an X-ray apparatus, for example, dark images and normal images can be acquired in an alternating fashion by operating the X-ray source at half the frequency. This ensures that the dark images are up to date ton a high degree, so that drift phenomena of the equipment cannot have serious effects.

The invention also relates to an imaging device which comprises a two-dimensional array of image sensors as well as an evaluation unit which is capable of reading out and processing the pixel signals, representing output signals of image sensors which have been combined by binning, at a maximum rate of no more than $G_{max}$.

The imaging device is arranged
  To enable the presetting of at least one parameter in order to define a sub-region of the field,
  to define any remaining parameters for defining the sub-region as well as the binning factor b and the imaging rate f in such a manner that the maximum rate $G_{max}$ of the evaluation unit is not exceeded during the reading out of all image point signals from the sub-region.

The described method can be carried out by means of the imaging device in such a manner that its advantages are realized. The imaging device can also be extended in such a manner that it can also carry out the various versions of the described method.

The imaging device is preferably an X-ray apparatus which is provided with an adjustable diaphragm arrangement in the beam path, at least one adjusting parameter of the diaphragm arrangement being presettable while any remaining adjusting parameters of the diaphragm arrangement are automatically set. When the diaphragm arrangement defines, for example, a rectangular, centered region, the width of this region can advantageously be preset manually whereas the height of the region is calculated and adjusted automatically.

Figure 2:
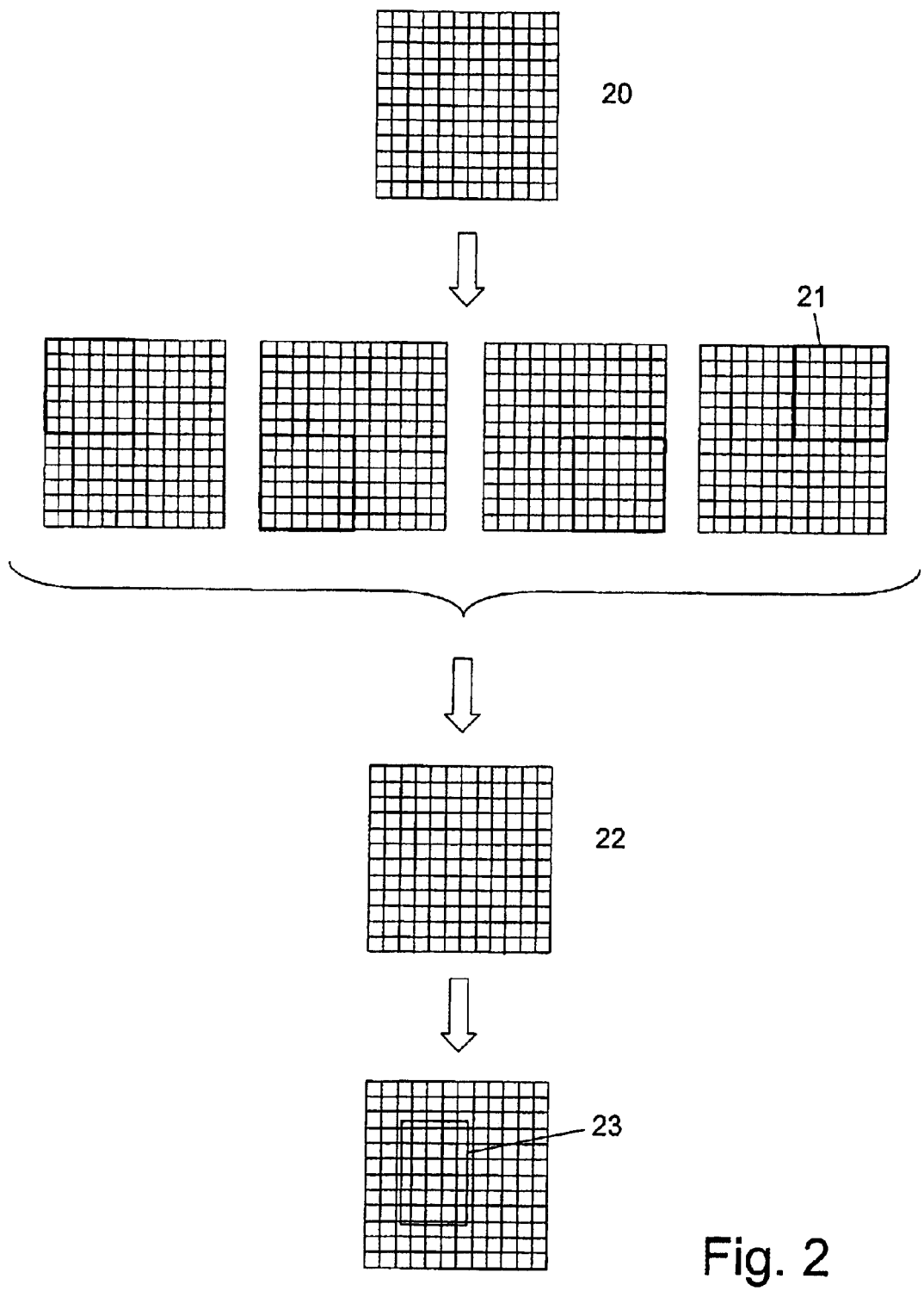

The invention will be described in detail hereinafter with reference to the Figures. Therein:

FIG. 1 shows a flow chart illustrating the method in accordance with the invention, FIG. 2 shows the formation of calibration images for an arbitrary sub-region.

FIG. 1 illustrates the operation in accordance with the invention of a flat dynamic X-ray detector (FDXD) 13 which consists of an array of image sensors which are arranged in rows and columns. Instructions and information u can be applied to the detector by an evaluation unit 1 (workstation) and pixel signals i of an image can be read therefrom. The number of image sensors of such an FDXD 13 typically is very large ($\geq 2000 \times 2000$) and in principle complete images can be read out from the detector 13 with a high imaging or image rate of typically 30 Hz. However, according to the present state of the art it is not possible to read out the entire detector 13 with such high imaging rates and to process the images in the evaluation unit 1. Therefore, in customary detectors either a restriction is made to a few sub-regions which are permanently defined by the construction, which are centered in the detector field and which have an approximately square shape and comprise a smaller number of image sensors, or a binning operation is performed so as to combine groups of 2×2, 3×3 or in general n×m image sensor signals into one pixel, be it at the expense of a loss of spatial resolution. Furthermore, the imaging rate f can also be lowered.

The conditions during the acquisition of an image by means of the FDXD 13 are assembled in a so-called mode which comprises the following parameters: sub-image or full image; extent of the binning operation (where a non-active binning operation formally corresponds to binning with 1×1 image sensors); analog gain setting within the detector; maximum exposure time of a single image; imaging rate.

Furthermore, for X-ray detectors the fact must be taken into account that an acquired image must be individually calibrated for each mode in order to achieve an acceptable image quality. Notably the offset (image signals without radiation input) the gain (pixel-wise different characteristic of the conversion of the amount of radiation into an electrical signal) as well as defects (faulty pixels etc.) are then taken into account.

The approximately square and centered sub-regions which are permanently defined in customary X-ray detectors are sub-optimum for many applications. For example, for medical images of the oesophagus or the veins in a leg a rectangular format would be better suitable, for example, a format with an aspect ratio of 1:2. In order to achieve this object, in accordance with the invention it is arranged that the position, the size and/or the shape of a sub-region to be imaged can be configured at will from the array of image sensors. Examples of realizations of this concept will be described in detail hereinafter with reference to FIG. 1. In this respect it is assumed that the selected sub-regions should have a rectangular shape, so that their size can be described by a width $\Delta x$ and a height $\Delta y$.

The adjusted imaging rate (for example, 7.5; 15; 30 or 60 Hz) is denoted hereinafter by the letter f and the maximum rate of the evaluation unit 1 and of the transmission link between the evaluation unit 1 and the FDXD 13 is referred to as $G_{max}$ (for example, 40 million pixel signals per second). Data in excess of the value $G_{max}$ cannot be transmitted or not be corrected and reproduced. Furthermore, the binning factor b is assumed to describe the number of output signals of single image sensors which are combined so as to form a pixel signal (for example, averaged output signals). When generally nxm image sensors are combined so as to form one pixel signal (virtual pixel), the binning factor thus amounts to (n.m). Inactive binning can be described, formally speaking, by a binning factor b=1.

On the basis of the above definitions, the condition that for given values of the imaging rate f and the binning factor b a selected sub-region can still be processed by the evaluation unit 1, can be described by the following inequality:

$$\Delta x \cdot \Delta y \cdot f/b \leq G_{max} \quad (2)$$

This inequality represents the special case of the inequality (1) for rectangular sub-regions. The parameters stated at the left of this inequality are partly preset for the methods proposed hereinafter, and remaining parameters are subsequently adapted in such a manner that the inequality is (still) satisfied.

EXAMPLE 1

Confirmation in the Service Mode

In the simplest case the adjustment of arbitrary sub-regions can be performed by a technician only in a service mode. In conformity with the requests and wishes specified by the user, at least one sub-region is then configured. Preferably, this sub-region is subsequently calibrated. The sub-regions thus pre-configured and calibrated can be allocated given mode numbers (M1, M2, . . . ) via which they can be called up in clinical operation. Alternatively, for each change of mode the detector can also be supplied with parameters on the basis of which the mode can be recognized, for example, four parameters for the size and position of the sub-region. In respect of operation the clinical operation itself does not deviate from that of conventional systems in which the sub-regions are configured so as to be invariable in the X-ray equipment.

EXAMPLE 2

Collimation Limitation without Reading Out of Dark Images

The second version of the method is based on the assumption that offset correction is not necessary or that a dark image of the entire field has been generated by means of the mosaic calibration (described hereinafter) prior to the beginning of the examination sequence. This version is characterized in that, in order to adhere to the maximum data rate $G_{max}$ in conformity with the inequality (2), the width $\Delta y$ of the sub-region is adapted, whereas the other variables are preset. This means that priority is given to the resolution (b, f remain fixed). During a series of image acquisitions, the actually existing insertion ($\Delta x_a$, $\Delta y_a$) can be changed at will by the physician. This takes place in the following steps:

1. The physician changes the collimation on the collimator 12 in one direction, for example, the x direction: $\Delta x_a \rightarrow \Delta x_n$.

2. The evaluation unit 1 detects the adjusted position $\Delta x_n$ of the collimator 12 in the block 2 and calculates therefrom the position and the size of the currently adjusted sub-region. Furthermore, the current data of the imaging rate f and the binning factor b is known.

In block 3 the data rate G* is calculated for the current settings and it is checked whether it is still below the maximum data rate $G_{max}$.

3. If this is not the case, in block 4 a value $\Delta y_n$ is calculated for the adjustment of the y direction of the collimator 12, thus ensuring that the inequality (2) is satisfied. The new value $\Delta y_n$ is then applied to the collimator 12 in which a corresponding adjustment is carried out.

4. an block 5 the position and size determined for the sub-region are transferred to the detector 13.

5. The detector 13 and its read-out system adjust themselves to the transferred data, so that the detector is prepared to receive the next image.

6. Subsequently, the next X-ray pulse is triggered in the X-ray source (not shown) and the detector 13 delivers, in conformity with the adjusted parameters, the resultant image i of the preset sub-region to a buffer 7 of the evaluation unit 1.

7. Calibration images produced by the mosaic calibration 14 (yet to be described) for the entire field of the detector 13 are stored in a memory 15. They include notably an offset image, a gain reference as well as a map with defects. In the block 6 of the evaluation unit sub-region calibration images are calculated for offset, gain and defects while taking into account this data of the memory 15. These images are used in the block 9 for a calibration and correction of the current image from the block 7 so as to generate a corrected image 10. The latter can subsequently be reproduced, for example, on a monitor 11. The block 8 which is also shown in FIG. 1 is not required for this version of the method.

The clinical operation of the X-ray equipment in conformity with the described version of the method thus takes place continuously also during the collimation operation. The data transmission, data correction and data reproduction are limited to the exposed region of the detector 13. In case an axis (x) is adjusted so that it is too large, the other axis (y) will be automatically reduced.

EXAMPLE 3

Collimation Limitation with Reading Out of Dark Images

If the mosaic calibration 14 cannot be used for offset images, in conformity with a third version of the method offset images are read out during the collimation. Furthermore, like in the second version, in this version the width $\Delta y$ of the sub-region is again adapted so as to satisfy the inequality (2), the other variables being preset. The acquisition procedure is then performed in the following steps.

1.-5. The steps 1 to 5 are identical to those of the second version. After the step 5, however, it is not possible to acquire an X-ray image immediately, because it is first necessary to acquire an offset image of the adjusted sub-region, since in conformity with the assumptions such an offset image cannot be derived from the memory 15.
6. The X-rays of the X-ray source (not shown) are switched off prior to the next acquisition.
7. A dark image D1 is read for the offset correction of the next image and stored in the block 8.
8. Subsequently, the X-rays are switched on again and an image of the same sub-region is read out. This image can then be processed in the block 9, using the dark image D1 from the block 8, so as to form a corrected image 10 which can be reproduced on the monitor 11.
9. Should the collimation on the collimator 12 have meanwhile changed relative to the preceding acquisition, that is, if the collimation procedure has continued, the steps 1 to 8 are repeated. Depending on the number of dark images stored on average (approximately 30) and the imaging rate (approximately 30 Hz), the changing of the collimation then takes approximately one second. During this phase the detector 13 continues to operate with the preselected imaging rate f. The X-ray exposure, however, takes place at half the frequency only because of the switching on and off of the X-ray source.
10. Upon termination of the collimation operation, an adequate number of dark images is read out for the offset correction (approximately 30) and averaged in conformity with a method which is known from the state of the art. No X-rays are generated during the acquisition of the dark images.
11. Subsequently, the X-rays are switched on again and the clinical operation is continued with the newly adjusted sub-region for all subsequent exposures.

EXAMPLE 4

Automatic Binning

In accordance with the fourth version, a priority is given to the size of the adjusted sub-region, and the resolution of the detector is adapted by the binning operation, that is, the combining of a plurality of image sensors so as to form a virtual pixel. In order to satisfy the inequality (2), therefore, the parameter b is varied. The treatment of the offset images can be performed in the same way as in the second version and the third version and, therefore, will not be described again. In the case of the fourth version a clinical acquisition takes place in the following steps:

1. The physician changes the collimation in the x direction: $\Delta x_a \rightarrow \Delta x_n$.
2. The evaluation unit 1 calculates in the block 4 the maximum y collimation $\Delta y_n$ compatible with the adjusted imaging rate f and triggers its adjustment.
3. Subsequently, in the block 5 it is checked whether the current parameters $\Delta x_n$, $\Delta y_n$, f and b satisfy the inequality (2). If this is not the case, step-wise incremented binning factors b=4, 9, . . . are tried until the smallest binning factor $b_{min}$ is found for which the inequality (2) is satisfied. This factor is then transferred to the detector 13 together with the other variables.
4.ff The steps 4 to 7 or 4 to 11 are carried out in the same way as in the described second version and third version, respectively.

Thus, according to the fourth version any size of sub-region can be adjusted, because the binning is adapted if necessary.

EXAMPLE 5

Automatic Adaptation of the Imaging Rate

In conformity with the fifth version the imaging rate f is adapted so as to satisfy the inequality (2). The treatment of the offset images is performed in the same way as in the second and the third version. The execution of a clinical acquisition is performed in the following steps:

1. The physician changes the collimation in the x direction: $\Delta x_a \rightarrow \Delta x_n$.
2. The evaluation unit calculates in the block 4 the maximum y collimation $\Delta y_n$ compatible with the adjusted imaging rate f and triggers its adjustment.
3. In the block 5 it is checked whether the current data $\Delta x_n$, $\Delta y_n$, f, b satisfy the inequality (2). If this is not the case, successively smaller imaging rates f are tried in conformity with the feasible steps of, for example, 60 Hz, 30 Hz, 20 Hz, 15 Hz, 10 Hz, 7.5 Hz, . . . , until the highest imaging rate $f_{max}$ is found for which the inequality (2) is still satisfied. This imaging rate is then transferred to the detector 13 together with the other parameters.
4.ff The steps 4 to 7 and 4 to 11 are carried out in the same way as in the described second version and third version, respectively.

Thus, in conformity with the fifth version any size of the sub-region can be adjusted, because the imaging rate f is adapted if necessary. For comfortable operation in this mode the imaging rate should be adjustable in as many steps as possible.

EXAMPLE 6

Mosaic Calibration

Referring to FIG. 2, the mosaic calibration performed in block 14 of FIG. 1 will be described in detail hereinafter. This calibration serves to acquire calibration images (for example, dark images, defect maps etc.) for predetermined data of the binning factor b and the imaging rate f for the entire field of the detector 13, so that they can be called up as simply as possible during later operation of the X-ray equipment. The direct acquisition of such calibration images usually is not possible because of the data rate limitation in conformity with the inequality (2).

In conformity with the mosaic calibration, the entire field 20 of the detector is first (logically) subdivided into sub-regions which cover the entire surface. Preferably, these sub-regions have the shape of a tile or a strip. The sub-regions may also overlap. Their size is chosen to be such that an image can be derived for the relevant sub-region while satisfying the inequality (2). Therefore, the desired calibration images 21 (for example, dark images) can be acquired for each of the sub-regions. In as far as exposure of the X-ray detector to X-rays is necessary during the acquisition of the calibration images, such exposure takes place for the entire detector surface 20. Consequently, the circumstances are the same for each image sensor.

The calibration images 21 are combined in the next step so as to form virtual overall calibration images 22 for the entire detector field. Virtual overall dark images, virtual overall gain images and virtual overall defect images can notably be acquired in this manner. For the described approach the assumptions are the same as for the customary calibration of a detector, which means that the calibration results must be stable and reproducible for a significant period of time. The analog parasitic properties of the detector are not important for as long as they are reproducible. The analog part of the image formation is absolutely the same for all sub-images. The entire detector is exposed and all analog channels are electronically read out. The only difference consists in that information which does not belong to a sub-region is not electronically transferred.

If slight temporal drifts of the detector cannot be precluded during the calibration, the necessary m images of the n sub-regions can be acquired in a mixed temporal sequence. The effect of the temporal drift is thus eliminated. This means that, as opposed to the simple sequence ($K_{11}, \ldots, K_{1m}, \ldots, K_{n1}, \ldots, K_{nm}$) a mixed sequence ($K_{11}, K_{12}, \ldots, K_{n1}, K_{n12}, \ldots, K_{nm}$) is chosen, where $K_{nm}$ is the image bearing the number m of the sub-region n.

Because usually at the most four or sixteen sub-regions are required for a full image, the additional expenditure for the mosaic calibration is acceptable, the more so because it can be carried out automatically.

For the calibration of a current clinical image (block 9 in FIG. 1) a sub-image 23 is taken from the overall calibration image 22, the size and position of said sub-image corresponding exactly to the clinical single image. This can be very simply performed, so that the clinical use of the device is not burdened by the acquisition of calibration images.

The mosaic calibration must be performed for all relevant imaging rates f and binning factors b. In the case of low imaging rates, only a sub-region is required for the entire detector, which means that the mosaic calibration changes over into a conventional calibration in conformity with the state of the art.

The invention claimed is:

1. A method of operating an imaging device with a two-dimensional field of image sensors as well as an evaluation unit which is capable of reading out and processing the pixel signals, representing output signals of image sensors combined by a binning operation, at a maximum rate of no more than $G_{max}$, comprising:
   presetting, on said imaging device, at least one parameter in order to define a sub-region of the field; and
   deriving, by said imaging device, any remaining parameters for defining the sub-region as well as a binning factor b and an imaging rate f, said deriving being performed, in view of the at least one preset parameter, in such a manner that the maximum rate $G_{max}$ of the evaluation unit is not exceeded during the reading out of all pixel signals from the sub-region, the location of said sub-region within said field being unique and corresponding to said at least one parameter and said any remaining parameters.

2. The method as claimed in claim 1, wherein the image sensors are arranged in a periodic pattern in a rectangular field, the sub-region having a rectangular shape with its sides extending parallel to the edges of the field.

3. The method as claimed in claim 1, wherein the image sensors are X-ray sensors.

4. The method of claim 1, said device having a service mode, said sub-region being preset in said service mode.

5. A method as claimed in claim 1, the evaluation of the pixel signals being performed by means of calibration images related to the sub-region.

6. The method as claimed in claim 5, wherein:
   sub-regions are selected which cover the entire field of the image sensors;
   for each of the sub-regions related calibration images are generated with predetermined imaging parameters;
   from the calibration images of the sub-regions there are generated overall calibration images for the imaging parameters which are related to the entire field of image sensors; and
   calibration images for an arbitrary new sub-region are acquired from the overall calibration images.

7. The method as claimed in claim 5, wherein dark images of the sub-region are generated and used as calibration images.

8. An imaging device which includes a two-dimensional field of image sensors as well as an evaluation unit which is capable of reading out and processing the pixel signals, representing output signals of image sensors combined by a binning operation, at a maximum rate of no more than $G_{max}$, the imaging device being configured to enable presetting of at least one parameter in order to define a sub-region of the field, and further configured for deriving any remaining parameters for defining the sub-region as well as a binning factor b and an imaging rate f, said deriving being performed, in view of the at least one preset parameter, in such a manner that the maximum rate $G_{max}$ of the evaluation unit is not exceeded during the reading out of all pixel signals from the sub-region, the location of said sub-region within said field being unique and corresponding to said at least one parameter and said any remaining parameters.

9. The method as claimed in claim 1, wherein said any remaining parameters amount to one or more parameters.

10. The method as claimed in claim 4, wherein said deriving of the factor b and the rate f occurs in a mode distinct from said service mode.

11. An imaging device comprising:
   a two-dimensional field of image sensors, said field being divided into pixels for outputting pixel signals representing output signals of said image sensors combined by a binning operation at a binning factor of unity or greater; and
   an evaluation unit configured for, at a maximum rate of no more than $G_{max}$, reading out and processing said pixel signals,
   said imaging device being configured to enable presetting of at least one parameter in order to define a sub-region of said field, said sub-region comprising less than all of said field, but a plurality of said pixels,
   said imaging device being further configured for, based on said at least one preset parameter and on said maximum rate $G_{max}$, deriving a) any parameters for defining the sub-region that were not preset in said presetting, b) said binning factor, and c) an imaging rate.

12. A method for making an imaging device comprising:
providing a two-dimensional field of image sensors;
configuring said device so that said field is dividable into pixels for outputting pixel signals representing output signals of said image sensors combined by a binning operation at a binning factor of unity or greater;
configuring an evaluation unit capable of reading out and processing said pixel signals, but at no more than a maximum rate of $G_{max}$;
further configuring said device for presetting at least one parameter in order to define a sub-region of said field, said sub-region comprising less than all of said field, but a plurality of said pixels; and
further configuring said device for, based on said at least one preset parameter and on said maximum rate $G_{max}$, deriving, by said device, a) any parameters for defining the sub-region that were not preset in said presetting, b) said binning factor, and c) an imaging rate.

13. The method as claimed in claim 12, wherein said parameters for defining the sub-region that were not preset in said presetting amount to one or more parameters.

14. An article of manufacture, comprising a non-transitory computer-readable medium having instructions encoded thereon for enabling a processor to perform the method of claim 1.

15. A computer software product for use with an evaluation unit capable of reading out and processing pixel signals of a two-dimensional field of image sensors at a maximum rate of no more than $G_{max}$, said field being dividable into pixels for outputting said pixel signals representing output signals of said image sensors combined by a binning operation at a binning factor of unity or greater, said product comprising a non-transitory computer readable medium embodying a computer program that includes instructions executable by a processor to perform a plurality of acts, said plurality comprising the acts of:
    presetting at least one parameter in order to define a sub-region of the field, said sub-region comprising less than all of said field, but a plurality of said pixels; and
    based on said at least one preset parameter and on said maximum rate $G_{max}$, deriving, by said imaging device, a) any parameters for defining the sub-region that were not preset in said presetting, b) said binning factor, c) an imaging rate.

16. The method of claim 1, wherein said deriving being performed in said such a manner is performed in view of $G_{max}$.

17. The imaging device of claim 8, for which said deriving being performed in said such a manner is performed in view of $G_{max}$.

18. The method as claimed in claim 16, wherein said deriving comprises following, by said imaging device, specified rules in conformity with which variables are changed relative to their current values in order to ensure that the maximum rate $G_{max}$ is adhered to.

19. An imaging device as claimed in claim 11, further comprising:
    a beam path; and
    an X-ray apparatus with an adjustable diaphragm arrangement in the beam path, said arrangement including an adjustable diaphragm device, said apparatus being configured such that at least one adjustment parameter of said diaphragm device is among said at least one preset parameter.

* * * * *